United States Patent
Hartman et al.

(10) Patent No.: US 12,397,846 B2
(45) Date of Patent: Aug. 26, 2025

(54) STEERING COLUMN SHROUD BREAK AWAY INTERFACE

(71) Applicant: NSK STEERING SYSTEMS AMERICA, INC., Ann Arbor, MI (US)

(72) Inventors: David Ray Hartman, Brighton, MI (US); Simon Read, Dexter, MI (US)

(73) Assignee: NSK STEERING SYSTEMS AMERICA, INC., Ann Arbor, MI (US)

( * ) Notice: Subject to any disclaimer, the term of this patent is extended or adjusted under 35 U.S.C. 154(b) by 0 days.

(21) Appl. No.: 18/685,291

(22) PCT Filed: Sep. 13, 2022

(86) PCT No.: PCT/US2022/043324
§ 371 (c)(1),
(2) Date: Feb. 21, 2024

(87) PCT Pub. No.: WO2023/043725
PCT Pub. Date: Mar. 23, 2023

(65) Prior Publication Data
US 2024/0425100 A1    Dec. 26, 2024

Related U.S. Application Data

(60) Provisional application No. 63/244,763, filed on Sep. 16, 2021.

(51) Int. Cl.
*B62D 1/19*    (2006.01)
*B62D 1/185*    (2006.01)

(52) U.S. Cl.
CPC .............. *B62D 1/192* (2013.01); *B62D 1/185* (2013.01)

(58) Field of Classification Search
CPC ........ B62D 1/192; B62D 1/185; B62D 1/195; B62D 1/184
See application file for complete search history.

(56) References Cited

U.S. PATENT DOCUMENTS 2,910,887 A * 11/1959 Helms ................... B62D 1/184
 74/493
4,086,825 A * 5/1978 Badcock ................ B62D 1/192
 464/71

(Continued)

FOREIGN PATENT DOCUMENTS

| CN | 105209317 A | * 12/2015 | ............. B62D 1/195 |
| DE | 3136812 A | * 4/1982 | ............... B62D 1/16 |
| DE | 3136812 A1 | 4/1982 | |

OTHER PUBLICATIONS

H. Otsuka, DE 3136812 Steering column covers for vehicles, Machine English Translation, ip.com (Year: 1985).*

(Continued)

*Primary Examiner* — Karen Beck
(74) *Attorney, Agent, or Firm* — The Dobrusin Law Firm, P.C.

(57) ABSTRACT

A portion of a shroud (30) is adapted to be secured to a steering column assembly (10). The portion of the shroud (30) includes a slot (46) for receiving a portion of a fastener (36) and an opening (48) of sufficient size that at least a portion of the fastener (36) is permitted to fit through to allow the shroud (30) to break away from the steering column assembly (10) upon an impact exceeding a threshold load. The shroud (30) is fastened to the steering column assembly (10) via a fastener (36) and a connection member that is joined to the column tube.

20 Claims, 3 Drawing Sheets

(56) References Cited

U.S. PATENT DOCUMENTS

| | | | |
|---|---|---|---|
| 4,194,411 A * | 3/1980 | Manabe | B62D 1/195 |
| | | | 188/376 |
| 4,400,012 A | 8/1983 | Otsuka | |
| 6,467,807 B2 | 10/2002 | Ikeda et al. | |
| 11,518,428 B2 * | 12/2022 | Chong Hok Yuen | B62D 1/192 |
| 2010/0300238 A1 | 12/2010 | Ridgway et al. | |

OTHER PUBLICATIONS

International Search Report and Written Opinion dated Dec. 15, 2022, for International Application PCT/US2022/043324.

* cited by examiner

STEERING COLUMN SHROUD BREAK AWAY INTERFACE

FIELD

In general, the present teachings relate to an improved collapsible steering column assembly and methods associated with the same (e.g., methods of providing energy absorption and breakaway of components during, such as during a secondary impact).

BACKGROUND

During a vehicle collision, there are commonly two impacts. In a primary impact, the vehicle impacts another object. In a secondary impact, a vehicle occupant impacts a component of the vehicle. For example, a vehicle operator sometimes impacts the steering wheel due to inertia. In order to help try to protect drivers from such secondary impacts, it has become common practice to use an impact-absorbing type steering column. A collapsible steering column system is an example of an impact-absorbing type steering column.

The structure of an impact-absorbing type steering column apparatus is such that when the driver suffers a secondary impact, the impact energy acts on the steering column in the frontward direction of the vehicle. The steering column may detach from one or more fixation points with the vehicle body and move forward (e.g., in a collapse stroke), so that the impact energy is absorbed in the course of the collapse stroke. An external collapsing column assembly is an example of a system in which the entire column will translate relative to its fixation points. An internal collapsing column assembly typically will be fixed at one or more fixation points near one of the ends of the assembly within the vehicle. During a collapse stroke from a secondary impact, components of the assembly will longitudinally collapse (e.g., generally within the volume it occupies within the vehicle in normal operation; that is, generally within its "footprint" in the vehicle) or break away, but generally will not collapse beyond a certain distance relative to a predetermined fixation point. An internal collapsing system thus has a stroke, but may remain fixed to the vehicle at the one or more fixation points.

For many applications, steering column assemblies incorporate one or both of a tilt or telescopic function. For these applications, it is common to employ levers for manual performance of such functions by a vehicle user. By way of example, in what is known as a "manual rake and reach" steering column assembly, the assembly will have both a tilt ("rake") and a telescopic ("reach") function, with a lever provided for a vehicle user to manually release for affording rake and reach adjustment to a selected position, and then to re-engage for fixing the steering column in the selected position.

A steering column shroud acts to enclose or cover parts of a steering column assembly, protect elements of the steering column assembly, separate the driver from the components of the steering column assembly, or a combination thereof. The shroud may remain generally fixed in place. However, upon an impact exceeding a threshold load, it may be desirable to have the shroud break away or collapse in an effort to protect the driver.

In some steering column layouts and associated shroud attachments, it is desirable to have the steering column shroud attachment further away from the steering wheel to better support the steering column shroud. Often, this requires lengthy and complex brackets to support the shroud while not limiting the collapse stroke of the steering column during a secondary impact. In other instances, such as in steering columns equipped with some telescope positive lock mechanisms or in power adjustable columns, the shroud attachment point is fixed during the steering column collapse, so a method to separate the shroud from the fixed attachment point is needed. Some steering column designs have a breakaway plastic boss on the column tube that breaks off the column tube when it hits the housing. However, this results in a load spike midway during the column collapse, which is typically not desirable for optimal collapse performance.

Notwithstanding efforts to improve collapsible steering column assemblies, (e.g., internally collapsible steering column assemblies), there remains a need for alternative assemblies, particularly those that provide breakaway load control of the shroud, a compact design without long brackets, and no mid-collapse load spike.

SUMMARY

The present teachings make use of a simple, yet elegant, construction approach by which relatively few components can be employed for achieving an energy absorbing steering column assembly, such as a collapsible steering column assembly. The present teachings also make use of a simple, yet elegant, construction approach for enabling the breaking away or separating of certain elements within the assembly, especially upon meeting certain conditions, such as an impact exceeding a threshold load.

The present teachings envision a portion of a shroud adapted to be secured to a steering column assembly. The portion of the shroud may include a slot for receiving a portion of a fastener. The portion of the shroud may include an opening of sufficient size that at least a portion of the fastener is permitted to fit through the opening to allow the shroud to break away from the steering column assembly upon an impact exceeding a threshold load. The portion of the shroud may be a boss projecting toward a portion of the steering column assembly. The slot may be connected to or begin at the opening, such that a portion of the fastener may be permitted to slide in and/or out of the slot through the opening.

A fastener may be used to join the shroud to the steering column assembly. The fastener may have a head and an elongated body. The head may have a width or diameter that is greater than the diameter of the cross-section of the elongated body. The width or diameter of the head of the fastener may be greater than the width of the slot (e.g., to prevent pull-through of the fastener through the slot in a direction generally perpendicular to the direction of extension of the slot). The opening of the shroud may be larger than the head of the fastener so the head of the fastener may travel through the opening when the shroud breaks away from the steering column assembly.

The present teachings envision a connection member. The connection member may include one or more features for connecting elements of the vehicle and/or steering column assembly. The shroud may be fastened to the connection member via the fastener. The connection member may have a shroud attachment portion that contacts the portion of the shroud (e.g., the shroud boss). The shroud attachment portion may have a fastener opening for receiving the fastener. The connection member may be adapted to be secured to a column tube of the steering column assembly at a column tube contact segment. The connection member may include generally opposing side walls extending away from the column tube contact segment. The generally opposing side walls may include a slot for receiving an elongated member, such as a tilt bolt. The connection member may include an energy absorption segment connected to the column tube contact segment via a curved portion. The energy absorption segment may absorb energy by way of plastic deformation. The connection member may be fixed within the vehicle assembly. The connection member may include one or more generally transverse tabs for fixing the connection member within the vehicle assembly. The connection member may be adapted to break away or separate from a portion of the steering column assembly (e.g., a column tube during forward translation) during the impact exceeding a threshold load.

The assembly may include a biasing member. The biasing member may be integrally formed with the shroud. The biasing member may be a separate element. The biasing member may be one or more spring fingers formed in the portion of the shroud or boss. The spring fingers may extend into the slot. The biasing member may be a spring member. The biasing member may be a compressible member, such as a Belleville spring or an O-ring. The biasing member may be one or more crush ribs. The crush ribs may be located in the shroud, such as in an area receiving a portion of the fastener, an area of the slot, or both.

A breakaway load of the attachment between the shroud and the steering column assembly may be controlled by a pre-load of the shroud into the fastener and shroud attachment portion. The controlled pre-load may be about 25 N or greater, about 50 N or greater, or about 100 N or greater. The controlled pre-load may be about 1000 N or less, about 750 N or less, or about 500 N or less. The controlled pre-load may be controlled with a standoff. The standoff may be a shoulder on the fastener, a boss extending from the connection member (e.g., the shroud attachment portion), a boss extending from the shroud, a ring between the head of the fastener and the shroud or the connection member, or a combination thereof.

The present teachings also contemplate a collapsing steering column assembly. The steering column assembly may include a column tube, a steering shaft that is supported for rotation at least in part by the column tube, a column housing, a bracket for at least partially carrying the column tube, and a manually operated steering wheel adjustment subassembly including a lever for manually adjusting the position of the steering wheel. The steering column assembly may include the shroud of the present teachings. The steering column assembly may include the connection member of the present teachings. The shroud may be adapted to break away from the column tube upon an impact exceeding a threshold load. The connection member may be adapted to break away from the column tube upon an impact exceeding a threshold load.

In the steering column assembly, the column tube may be configured for telescoping insertion within the column housing. The steering wheel adjustment subassembly may be configured for selectively adjusting the steering shaft, column tube, or both, in a fore or aft direction generally along the longitudinal axis. The steering wheel adjustment subassembly may be configured for selectively raising or lowering the steering shaft, column tube, or both. The energy absorption segment may be adapted to absorb energy by way of plastic deformation during a forward translation of a column tube during the impact. A portion of the shroud may separate from the fastener and/or connection member joining the shroud to the steering column assembly.

DETAILED DESCRIPTION

Figure 1:
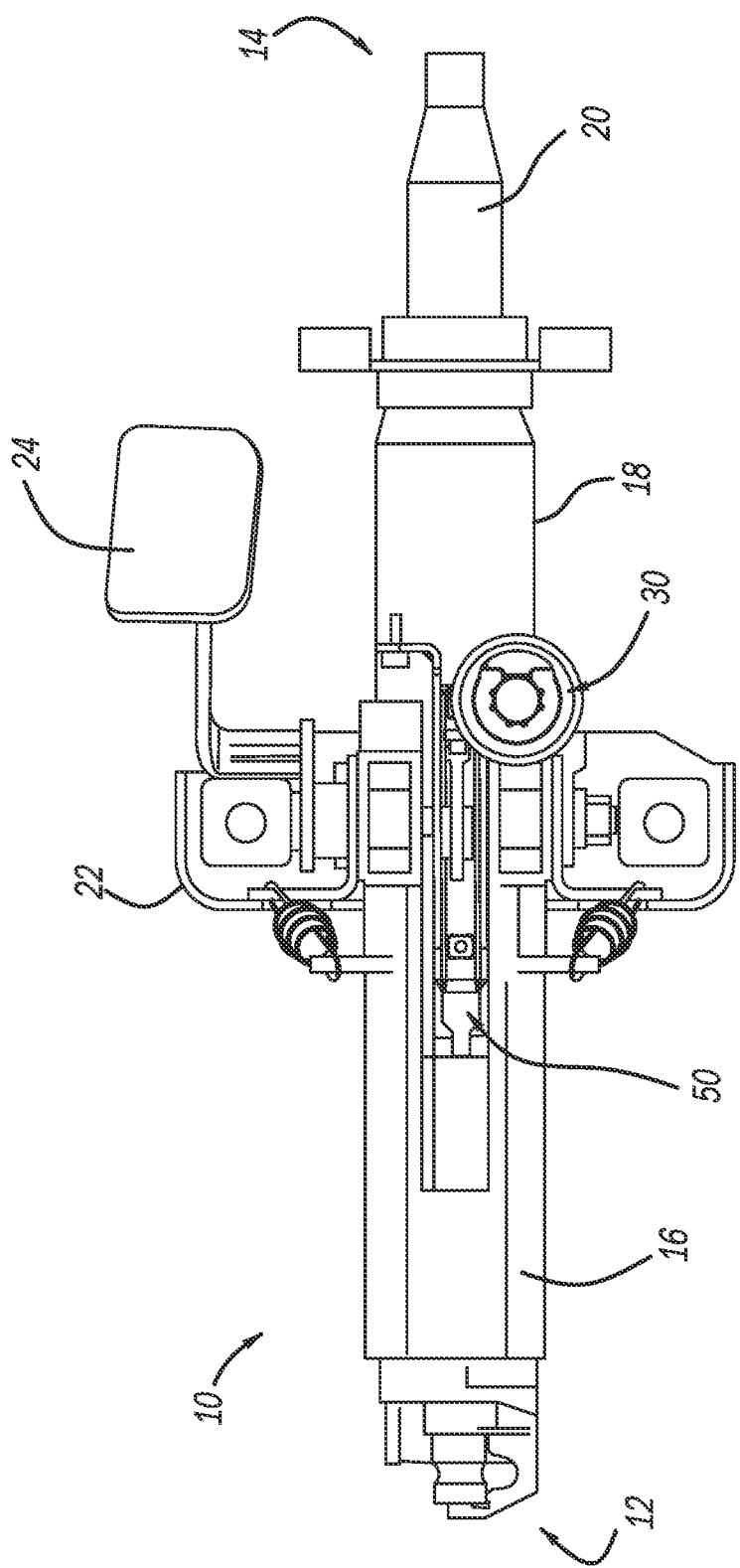
FIG. 1 is a bottom view of an exemplary steering column assembly in accordance with the present teachings.

As required, detailed teachings are disclosed herein; however, it is to be understood that the disclosed teachings are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present teachings.

In general, and as will be appreciated from the description that follows, the present teachings pertain to a collapsing steering column assembly. The steering column assembly may include a mounting portion (e.g., one or more bracket structures) for securing the steering column assembly in a vehicle in a fixed operational position. The assembly may have a collapsing portion, at least a portion of which is adapted to travel forward relative to the mounting portion, while the mounting portion stays generally in its fixed operational position (e.g., any travel of the mounting portion is controlled and limited to an amount of about 50 mm or less, about 20 mm or less, or about 10 mm or less). Among its basic concepts the teachings are directed to a steering column assembly that, in the event of an impact such as a secondary impact that results in a load of a certain threshold amount (e.g., a load of about 0.5 kN or more or about 2 kN or more; a load of about 10 kN or less or about 5 kN or less), may be adapted so that at least a portion of the collapsing portion travels forward within the vehicle. The forward travel may be in a telescopic manner (e.g., at least one first structure that is operatively connected to a steering wheel (such as a column tube) may advance forward (e.g., along an axis that is generally parallel with (such as within about 10° or more, about 30° or less, or both, of being parallel with) a vehicle longitudinal axis) in a vehicle relative to at least one second structure that may at least partially surround the at least one first structure (e.g., a column housing)).

The teachings envision that the steering column assembly may include a tilt or rake adjustment that is adapted to allow a user to select an angle of inclination of a steering wheel, a reach adjustment that is adapted to allow a user to select an appropriate fore-aft position of the steering wheel, or both. In general, any such adjustment may be controlled by a suitable user operating device (e.g., a lever, an electromechanical actuator, motor, or otherwise). For a manually operated system, a lever or other user operating device may be adapted to control a force applied to maintain the collapsing portion in a user selected position. For example, a lever or other user operating device may be in operative engagement with one, two, or more mechanisms to releasably (and possibly adjustably as well) secure two or more components of the collapsing portion together. Securing may be realized by a suitable securing member (e.g., an elongated force applying member), such as a bolt (e.g., a tilt bolt), rod, strap, bar, band, wedge, rotational member such as a cam, or other suitable member, or a combination thereof. For instance, the securing member may be adapted, upon actuation of the user operating device to cause a cam or rotational member to rotate and engage with a portion of a connection member to secure the steering wheel at its desired telescoped position.

The teachings, in general, also envision the possible use of one or more energy absorption devices. The energy absorption devices may be a suitable device adapted to deform elastically and/or elastically and plastically. In the course of deforming, the energy absorption devices are thus adapted to absorb energy by way of the deformation. The energy absorption device may be operatively connected or located between or among two or more components. It may be configured so that it limits relative movement as between or among two or more components. The energy absorption devices may be wires, plates, strips, or the like. They may have a constant profile or a varying profile along their length. They may be employed to have one or more fixedly constrained portions (e.g., an end). They may have one or more free ends.

In examples illustrated, teachings describe aspects useful for an internally collapsing steering column assembly for an automotive vehicle. In general, an assembly of the teachings herein may include a steering shaft (e.g., one that can be coupled with a steering wheel or other steering device) and/or a column tube that supports the steering shaft (e.g., via one or more bearings). A column housing may be employed. It may be adapted to telescopically couple with the column tube. The column housing and column tube each may have a longitudinal axis that is generally parallel or even coaxial with each other. One or more brackets may be employed for at least partially securing either or both of the column tube or the column housing to the vehicle (e.g., to a cross-vehicle structure). The bracket or one or more tilt plates may include a suitable portion (e.g., a slot such as a generally vertically oriented slot) adapted to provide a guide structure for a tilt function. A user operating device, such as a lever, may be employed for allowing a user to manually operate the assembly. The steering column assembly may be configured so that in the event of a threshold load realized during an impact such as a secondary impact, at least a portion the assembly (e.g., the column tube, steering shaft, steering wheel, or a combination thereof) is able to translate forward from its typical operational position. Therefore, the column tube may thus be rendered able to translate forward relative to the column housing, carrying with it the steering wheel attached. As a result, it can be seen that it is possible that the steering wheel is rendered able to translate forward, e.g., away from the user. There may be one or more elements adapted to break away from another element of the assembly during this forward translation. For example, a connection member may break away from a column tube.

The teachings address an assembly that may typically include a column tube, a steering shaft, a bracket (e.g., a tilt bracket, a pivot bracket, or both), a column housing, and a steering wheel adjustment subassembly (e.g., a manually operated steering wheel adjustment subassembly). The steering wheel adjustment subassembly may include a lever (as discussed, or some other user operating device) adapted for actuating (e.g., manually actuating) the subassembly via tilt, telescoping, or both. One or more motors may be used instead of or in addition to manual actuation via a lever. For example, one or more motors or other electromechanical actuators may cause tilt, telescoping, or both. It is further contemplated that a lever may be used to cause a tilt or telescoping function, while a motor or other electromechanical actuator may be used to cause the other of the tilt or telescoping function. At least one method of engagement (e.g., a toothed rotational member, a pin, a clamping mechanism) may be employed to engage with the column tube or a structure secured thereto for selectively locking the steering shaft into a position (e.g., telescoped position) desired by a user (e.g., via the lever). One or more rotational members may be brought into and out of engagement (e.g., via interference) with a portion of a connection member for adjustment of the telescoping position desired by a user (e.g., via the lever). A mounting structure may detachably mount the steering wheel adjustment subassembly relative to the bracket (e.g., tilt bracket). During an impact such as a secondary impact, the column housing may remain in a generally fixed position relative to a forward pivot mounting location (e.g., any forward translation is limited to a relatively small amount (e.g., about 20 mm or less or about 10 mm or less)).

The assemblies as described herein generally will include a tube that is operatively connected with a steering wheel, e.g., via a steering shaft. One such tube, referred to herein as a column tube, typically will have a hollow cavity along at least a portion of (if not the entirety of) the length of the tube and may be sized and configured to receive and support a rotatable shaft, namely a steering shaft and possibly one or more bearings. Both the shaft and the tube will have a longitudinal axis. When installed in a vehicle, the longitudinal axis of each the shaft and the tube (as well as the steering column assembly in general) may be generally coaxially aligned, aligned generally parallel with a longitudinal axis of a vehicle, or each. The shaft and the column tube may be made of or otherwise include a suitable metal, such as one or more of iron (e.g., steel), magnesium, zinc, or aluminum.

The column tube may be generally cylindrical and hollow. It may have a forward end portion and a rearward end portion, and a longitudinal axis. Either or both of the forward or rearward end portion may include a suitable bearing that supports the steering shaft for rotation.

The steering shaft may have a rearward end portion adapted to receive a steering wheel (not shown). It may have a forward end portion that penetrates through and may be supported by a bearing, a key lock collar or both. As noted, the steering shaft may be supported for rotation at least in part by the column tube and have a longitudinal axis that may be generally coaxially aligned with the longitudinal axis of the column tube.

One or more suitable brackets may be employed. Any such bracket may include a portion for mounting the steering column assembly within a vehicle (e.g., it can be secured to a vehicle structure, such as a cross vehicle beam, instrument panel, or otherwise). The bracket may have a portion that at least partially adjoins the steering shaft support structure (e.g., the column tube, the column housing, or both). For example, a bracket may include one or a plurality of downward depending (downwardly oriented) walls (e.g., tilt plates) that define a tilt portion of the bracket. One or more of the downward depending walls (e.g., tilt plates) may be adapted to provide a structure that has an elongated slot that provides guidance for the tilt function (e.g., it provides a guide path for a securing member such as a tilt bolt as it travels during adjustment; it may thus limit upward and downward travel). The bracket may be an integrated structure so that the tilt portion and the mounting portion are a single structure (e.g., a casting, a stamping, or a combination thereof). The bracket may be made of separate structures that are assembled together to define the mounting and tilt portions in a single structure. The mounting portion may be omitted and/or may be located elsewhere within the steering column assembly. For example, a mounting portion may be a pivot bracket located toward the forward end of the assembly, where the pivot point of the pivotal movement of the assembly occurs. The tilt portion may be omitted. A mounting bracket may be employed separately from a structure defining a tilt portion. Examples of brackets that may be employed, in addition to the examples described herein, include those of U.S. Publication No. 2010/0300238 (the entirety of which is incorporated by reference for all purposes; see, e.g., description of bracket 20); U.S. Pat. No. 6,467,807, the entirety of which is incorporated by reference for all purposes (see, e.g., description of brackets 6 and 7 and associated structure).

One or more brackets (e.g., tilt brackets) may be employed and adapted for receiving at least a portion of a steering shaft support structure (e.g., at least a portion of the column tube, the column housing, or both), and/or for mounting the steering column assembly within the automotive vehicle. By way of example, a tilt bracket of the present teachings may include an upper portion that is adapted to be secured to a vehicle structure, such as a cross vehicle beam, instrument panel, or otherwise. The bracket (e.g., tilt bracket) may have a pair of generally opposing downwardly oriented or projecting walls (e.g., tilt plates). The bracket (e.g., tilt bracket) may have a structure that at least partially flanks at least a portion of the steering shaft support structure (e.g., the column tube). The bracket (e.g., tilt bracket) may optionally include a pair of opposing side walls, and an upper wall that is configured to attach to the vehicle (e.g., to a cross vehicle beam, an instrument panel, or other suitable structure). The side walls may project outward relative to the upper wall (e.g., they may be generally orthogonally or obliquely disposed relative to the upper wall). The bracket (e.g., tilt bracket) may have a single downwardly projecting or oriented wall. The bracket (e.g., tilt bracket) may be disposed laterally above and outward relative to an opposing portion of the column housing.

It is possible that the teachings herein can be employed for steering column assemblies that are not adjustable, but which still require the ability to collapse. In such instances, there will be no rake or reach adjustment hardware. However, the concepts herein may still be adapted to achieve collapse. A mounting bracket may secure one or both of a column housing, or a column tube, to a vehicle. An energy absorption device may be employed to limit forward travel of one or more components of the steering column assembly, such as the column tube, steering shaft, or both.

The present teachings, however, have particular applicability for steering column assemblies that are adjustable (e.g., for rake and/or reach). The assembly may include a manually operated steering wheel adjustment subassembly adapted for selectively adjusting the steering shaft in a fore or aft direction generally along the longitudinal axis, selectively raising or lowering the steering shaft, or both. The steering wheel adjustment subassembly may include a lever or other adapted for manually actuating the subassembly. The subassembly may include at least one engagement member (e.g., a pin) that is brought into and out of engagement with the column tube or a structure secured thereto for selectively locking the steering shaft into a position desired by a user (e.g., a fore or aft position). Other suitable hardware may be employed in the subassembly, such as one or more thrust bearings, one or more nuts, one or more cam fix elements, and/or one or more cam move elements (e.g., where the cam fix and the cam move elements are in opposing operative relationship with each other, such as by contacting each other).

A column housing is pivotally mounted at a pivot mounting location (e.g., a permanently fixed mounting) within the automotive vehicle. The pivot mounting location may be at or within about 20, about 30, about 40 or about 50 mm of a forward end of the column housing. The pivot mounting location may be on an underside of the column housing, on a top side of the column housing, or at some location in between the topside and the underside of the column housing. The column housing at least partially surrounds the column tube. The column housing may have one or more projections or other structures to receive a biasing device (e.g., a spring) that connects the column housing with the tilt bracket. The column housing may be a cast structure (e.g., including a metal such as aluminum, magnesium, zinc, and/or iron (e.g., steel)). During a secondary impact, the column housing may remain in a generally fixed position relative to the pivot mounting location. It may be secured in such a way that it translates forward a relatively small amount (e.g., about 50 mm or less, about 20 mm or less, or about 10 mm or less).

During an impact (such as a secondary impact), the structures of the present teachings may be configured to include a suitable combination of elements arranged in a manner so that a column tube, steering shaft, or both, is able to translate forward longitudinally relative to the column housing.

The assembly herein may include a tilt adjustment subassembly. The subassembly may include a tilt bracket having one or more tilt plates or two or more tilt plates extending downwardly on opposing sides of the column tube, column housing, or both. The tilt plates may include one or more generally vertical slots. A tilt bolt or other elongated fastener may extend between the two tilt plates, and the tilt bolt may be received within the vertical slots. The height adjustment of the assembly may be possible by the tilt bolt moving upwardly or downwardly in the slots when the user operating device, such as a lever, is in an unlocked position. The assembly may be held at the desired angle or height when the user operating device, such as a lever, is moved into the locked position.

The present teachings may include a telescope adjustment subassembly. Features of the telescope adjustment subassembly may also serve to absorb energy during an impact, such as a secondary impact. The telescope adjustment subassembly may allow for adjustment of the steering wheel in a fore and aft position relative to a vehicle occupant (e.g., driver). The telescope adjustment subassembly may include a lever or other actuating member that allows the subassembly to be put into a locked and/or unlocked position. Upon unlocking the telescope adjustment subassembly, a user may be permitted to adjust the steering wheel. Upon locking the telescope adjustment subassembly, the steering wheel may remain in the desired location.

The steering column assembly and/or vehicle assembly may include a shroud. The shroud may function to protect the steering column assembly. The shroud may function to enclose the steering column assembly. The shroud may function to separate the driver from components of the steering column assembly. The shroud may be made of any suitable material that is capable of providing the desired appearance, the desired coverage of the steering column assembly, the desired protection to the driver, particularly during a collision, or a combination thereof. The shroud may be made of a polymeric material. The shroud may be molded to a desired three dimensional shape or to have desired contours. The shroud may be made of multiple pieces. For example, the shroud may have a lower portion situated below the steering column assembly and an upper portion situated above the steering column assembly. The shroud may have one or more features that allows for the shroud to snap into or be secured within the vehicle assembly. The shroud may have one or more features that engages with another portion of the shroud to create an enclosure for a portion of the steering column assembly. The shroud may include one or more openings for receiving a fastener to secure the shroud to the steering column assembly.

The shroud may have one or more projections or bosses that extend toward the steering column assembly. When referred to herein as the shroud, it is contemplated that the feature being described may be part of a shroud boss. It is also contemplated that the feature being described may be part of the shroud but not part of a shroud boss. The boss may provide a contact surface between the shroud and another element of the steering column assembly. The boss may provide a contact surface with a fastener. The boss may provide a contact surface with a connection member. The boss may be situated between a head of a fastener and a surface of the connection member (e.g., a shroud attachment portion). The boss may provide one or more openings for receiving a fastener. The boss may provide one or more openings for allowing a fastener to disengage from the boss. The boss may include one or more biasing features. For example the boss may include one or more crush ribs, one or more compressible fingers, or the like.

The steering column assembly may include a connection member. The connection member may act to connect the shroud to the steering column assembly. A fastener may extend through the shroud and connection member to secure the shroud to the connection member. The connection member may be further connected or in contact with another portion of the steering column assembly, such as the column tube.

The shroud may be connected to the steering column assembly via one or more fasteners. The fastener may be a pin, screw, bolt, rivet, the like, or a combination thereof. The fastener may have a head. The fastener may have an elongated body. The diameter or width of the head, measured from its widest point, may be wider than the diameter of the cross-section of the elongated member. The head may contact a portion of the shroud (e.g., a portion of the boss). The head may contact a ring, washer, or other member (e.g., a Belleville spring or an O-ring). The ring, washer, or other member may be located between the head of the fastener and a surface of the shroud (e.g., the boss). The head and/or ring, washer, or other member may be wider than an opening in the connection member and/or opening or slot in the shroud so the fastener does not pull through the opening or slot of the connection member and/or shroud during normal operation of the vehicle.

The shroud may have one or more openings for allowing the shroud to become disengaged from the fastener, connection member, or both. The disengagement or breakaway may occur upon an impact exceeding a threshold load. A boss may have an opening generally located at an edge of the contact surface (e.g., where the boss contacts the connection member), at a side portion of the boss, or both. The opening may have sufficient height such that the portion of the fastener located within the boss may slide out of the opening without contact. The opening may have sufficient width such that the portion of the fastener located within the boss may slide out of the opening without contact.

The shroud may have a slot that allows the fastener to slide into or out of the shroud. The slot may be joined to the opening, such that the fastener may slide in or out of the opening via the slot. The slot may have a width that allows the fastener and shroud to stay in a desired position during normal conditions or vehicle usage. The slot may have a width that allows the fastener and shroud to separate upon an impact exceeding a threshold load. The slot may have a width that is less than the width or diameter of the head fo the fastener. The slot may have a width that is less than the width or diameter of a washer ring or spring between the head of the fastener and the boss, such that the dead of the fastener and/or washer, ring, or spring does not pass through the slot toward the steering column assembly or a portion thereof. The slot may terminate at a location partway across the boss or the portion that contacts the connection member. The slot may terminate before extending through the entire length or width of the boss or the surface of the boss adapted to contact the connection member.

The assembly may include one or more biasing members. The biasing member may be integrally formed in the shroud. The biasing member may be one or more fingers integrally formed in the shroud (e.g., molded into the shroud and/or boss). The fingers may extend into the slot of the shroud. The biasing member may be one or more crush ribs formed in the shroud. The crush ribs may be located within an area defining the slot. The fingers and/or crush ribs may be adapted to contact a portion of the fastener. The fingers and/or crush ribs may contact the head of the fastener or shoulder of the fastener. The fingers and/or crush ribs may contact a portion of the elongated portion of the fastener. The fingers and/or crush ribs may create a friction fit for the fastener. The fingers and/or crush ribs may reduce space between the slot and a portion of the fastener. The fingers and/or crush ribs may reduce vibration or movement of the fastener within the shroud. The fingers and/or crush ribs may assist in holding the fastener in position during normal use but may allow the fastener to become dislodged from the shroud upon certain conditions (e.g., an impact exceeding a threshold load).

A biasing member may be a separate element from the shroud. The biasing member may be a compressible member or separate spring. For example, the biasing member may be a Belleville spring or an O-ring. The biasing member may be located between the head of the fastener and a surface of the shroud (e.g., between the head and the interior surface of the boss).

Upon an impact exceeding a threshold load, the shroud may break away from the fastener and/or connection member of the steering column assembly. The breakaway may be facilitated by the slot and the opening in the shroud to allow the fastener to be fastener of the shroud to the steering column assembly to pass through. The opening of the shroud may be positioned toward the rearward end of the steering column assembly such that as the column tube translates forward, the shroud can also collapse in a forward direction, even if the connection member remains fixed within the vehicle and/or steering column assembly. The slot may extend from a portion of the shroud to the opening in a rearward direction to permit the fastener to travel through the slot and through the opening during the breaking away.

The breakaway load of the attachment between the shroud and the steering column assembly (e.g., the connection member) is controlled to a predetermined range by a controlled pre-load of the shroud into the fastener and steering column attachment. The shroud may be pre-loaded into the steering column attachment point by the biasing member. The biasing member works with a controlled standoff to set or control the pre-load in a desired range. The controlled pre-load may be about 25 N or greater, about 50 N or greater, or about 100 N or greater. The controlled pre-load may be about 1000 N or less, about 750 N or less, or about 500 N or less. For example, the controlled preload may be about 100 N to about 500 N. The standoff may act to control the compression of the biasing member when the fastener is installed. The standoff may be a shoulder on the fastener. The standoff may be a boss coming off the steering column attachment point (e.g., a portion of the connection member, such as the shroud attachment portion). The standoff may be a boss coming off the shroud.

The connection member joining the shroud to the steering column assembly may contact the shroud at a shroud attachment portion. The shroud attachment portion may have a surface adapted to contact the shroud (e.g., at a boss of the shroud). The shroud attachment portion may extend from another portion of the connection member, such as a side wall of the connection member. The shroud attachment portion may extend away from the body of the connection member to reach the shroud. The shroud attachment portion that contacts the shroud may be generally perpendicular to a side wall of the connection member. The surface of the shroud attachment portion that contacts the shroud may be generally parallel to the surface of the segment of the connection member that contacts the column tube of the steering column assembly.

The shroud attachment portion may include an opening for receiving the fastener. The opening may engage with the fastener such that the fastener is secured within the shroud attachment portion. For example, the opening may be threaded to engage threads of a fastener, such as a screw or bolt. A nut may be positioned on the opposing side of the shroud attachment portion to secure the fastener. The opening may be generally aligned with a portion of the slot of the shroud so that the fastener can penetrate the shroud and be received within the opening of the shroud attachment portion.

A portion of the connection member may be secured to an outer surface of the column tube. The connection member may include a column tube contact segment. The column tube contact segment may provide a contact surface between the connection member and the outer surface of the column tube. The column tube contact segment may generally extend along an axis parallel to the longitudinal axis of the column tube, column housing, or both. The column tube contact segment may be generally planar. The column tube contact segment may have one or more sections or surfaces that are generally planar. The column tube contact segment may have a generally complementary shape (e.g., at the portion contacting the column tube) to reduce or prevent rocking of the connection member. The column tube contact segment may have one or more openings for receiving a fastener to secure the connection member to the column tube.

The fastener joining the connection member to the column tube may be any fastener capable of maintaining connection between the connection member and the column tube during normal operation and adjustment of the steering column assembly. The fastener may be a screw, pin, rivet, bolt, or the like. The fastener may be formed of a polymeric material. The fastener may be formed from a metal or metal alloy. The fastener may be a shearable fastener. The fastener may shear upon an impact exceeding a threshold load, thereby allowing the connection member to break away from the column tube. For example, the column tube may translate forward during an impact. The connection member may be generally fixed within the steering column assembly and/or within the vehicle assembly. As the steering column continues to travel forward while the connection member remains fixed, the rivets connecting the connection member and the column tube may shear.

The connection member may have one or more side walls extending from the column tube contact segment. The side walls may increase stiffness of the connection member. The side walls may be generally parallel. The side walls may be in a generally opposing relationship. The side walls may include one or more slots for receiving an elongated member (e.g., a tilt bolt). The elongated member may be permitted to travel within the slot during a telescoping adjustment. The slot may define the distance fore and/or aft that the steering wheel (and/or other elements of the steering column assembly) is able to translate during adjustment. The slot may serve as a stop during telescope adjustment. The boundaries defining the slot may act as a stop, restricting the fore and/or aft translation during adjustment. The slot and/or boundaries defining the slot may act as a guide for fore and/or aft translation during adjustment. The front and/or rear edge of the slot may restrict further movement as the elongated member contacts the edge. The top edge of the slot and the elongated member can be configured such that when the lock lever is in the unlock position, there is sufficient clearance between the top edge of the slot and the elongated member to allow for smooth telescopic adjustment. When the lock lever is in the locked position, the elongated member and top edge of the slot may be in close clearance or contacting.

The connection member may be fixed within the steering column assembly or within the vehicle assembly. The connection member may include one or more tabs extending therefrom, which allow the connection member to be fixed (e.g., with one or more fasteners). The tabs may be located at a rearward end, forward end, or both, of the connection member to mount the connection member within the assembly. The tabs may include one or more openings for receiving a fastener. A tab may extend from a side wall in a generally transverse orientation relative to the side wall. The tab may form an angle with the side wall of about 105 degrees or less, about 100 degrees or less, or about 90 degrees or less. The tab may be in any orientation that allows the connection member to be secured within the assembly or vehicle. A tab may extend from each side wall. The tabs may be generally parallel or coplanar with each other. The tabs may extend in generally opposing directions. The tabs may include one or more areas that provide flexibility between the side wall and the tab. The flexibility may allow for the area between the tab and the side wall to flex upon an impact or during conditions such as adjustment.

The assembly herein may further employ an energy absorption segment. The energy absorption segment may be a deformable plate, wire, or other structure adapted to deform upon certain conditions, such as an impact exceeding a threshold load. The energy absorption segment, when employed, may absorb energy by plastic deformation during the secondary impact after the column tube and/or steering shaft starts to translate along the column housing. The energy absorption segment may plastically deform. It may deform with or without plastic elongation, with or without plastic compaction, with or without plastic buckling, or any combination thereof. Any plastically deformable energy absorption device may thus limit the extent of longitudinal travel of the column tube, steering shaft, or both. The energy absorption segment may function to secure the position of the column tube, steering shaft, steering wheel, or a combination thereof in a desired fore or aft direction. The energy absorption segment a generally planar or flat section. The generally planar or flat section may be received within the column tube. The energy absorption segment may be generally parallel to the column tube contact segment of the connection member. The energy absorption segment may form an angle with the column tube contact segment that is about 45 degrees or less, about 35 degrees or less, or about 20 degrees or less. The energy absorption segment may be joined to the column tube contact segment at an arcuate or curved portion. A portion of the energy absorption segment and/or curved portion may engage with an opening, notch, or guide in the column tube (e.g., with or without additional fastening).

The energy absorption segment or a portion thereof may be located within the column tube. The curved or arcuate portion may curve around an edge or notch of the column tube. Upon an impact exceeding a threshold load, the column tube may translate forward, pushing the energy absorption segment and/or curved portion forward, causing deformation. The curved portion may be caused to straighten or otherwise deform. As the column tube continues to translate forward, different areas of the energy absorption segment may be caused to curve or otherwise deform. For example, the energy absorption segment may become shorter, while a portion of the connection member on the opposite side of the curved portion (e.g., the column tube contact segment or a portion adjacent thereto) may become longer and the area of the curved portion continues to change as the column tube translates forward and deformation is guided around the edge of the column tube and/or a guide structure.

A guide structure may be located on the edge or at a notch of the column tube. The guide structure may be separate from the column tube. The guide structure may function to guide deformation of the energy absorption segment and/or curved portion (e.g., upon an impact exceeding a threshold load). The guide structure may function to hold the energy absorption segment in position during ordinary use. The guide structure may have one or more slots for receiving at least a portion of the energy absorption segment and/or curved portion. The guide structure may be a pin or other member around which the energy absorption segment and/or curved portion may wrap or coil. The guide structure may be formed of any material suitable for withstanding the forces exerted upon it during the energy absorption segment and/or curved portion wrapping around it during a collision. For example, the guide structure may be formed of a polymeric material.

Turning now to the figures, FIG. 1 illustrates an exemplary steering column assembly 10 having a forward end 12 and a rearward end 14. The steering column assembly 10 includes a column housing 16 that supports a column tube 18 and a steering shaft 20. The steering shaft 20 is adapted for supporting a steering wheel (not shown) and is permitted to rotate as the steering wheel is rotated. The column tube 18 is mounted for linear telescopic movement within the column housing 16. Telescopic adjustment occurs via actuation of a user operating device, shown as a lever 24 to put the steering column assembly in an unlocked position and/or a locked position. A bracket structure 22 assists in mounting the steering column assembly 10 within a vehicle. The bracket structure 22 may also at least partially support a tilt adjustment subassembly, allowing the tilt adjustment of the steering shaft 20, column tube 18, column housing 16, or a combination thereof. A shroud 30 (or portion of a shroud, shown here as a shroud boss 32) is connected to the steering column assembly 10 via a connection member 50.

Figure 2:
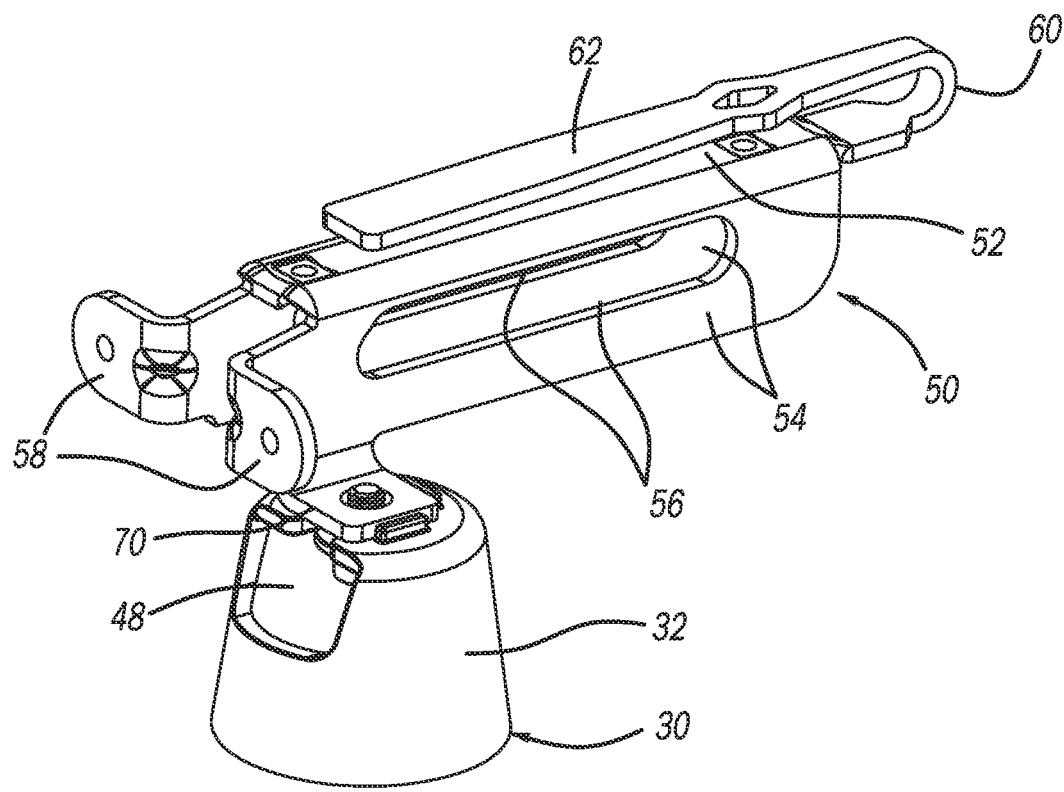
FIG. 2 is a perspective view of an exemplary connection member and shroud in accordance with the present teachings.

FIG. 2 illustrates a connection member 50 joined to a shroud 30, or a portion of a shroud shown as a shroud boss 32. The shroud boss 32 has an opening 48. The connection member 50 includes a column tube contact segment 52 adapted to be positioned on the outer surface of the column tube 18 (see FIG. 1). The connection member 50 may be secured to the column tube via fasteners, such as rivets. Two generally parallel side walls 54 extend from the column tube contact segment. Each side wall 54 includes a side wall slot 56. The side wall slots may receive and/or be penetrated by an elongated member, such as a tilt bolt. The side walls and slots may assist in telescoping adjustment of the steering column assembly. The side wall slots may act as a stop for the tilt bolt during a telescoping adjustment or an impact.

The connection member 50 includes one or more generally transverse tabs 58. As shown, a pair of generally transverse tabs 58 extend from the side walls 54 in generally opposing directions from each other. Both tabs 58 extend generally transverse from the side walls. The generally transverse tabs 58 may include one or more openings for fixing the connection member 50 within the vehicle. The generally transverse tabs may include one or more areas that provide flexibility between the side wall 54 and the tab 58, which may provide additional energy absorption.

The connection member 50 includes an energy absorption segment 62, which is joined to the column tube contact segment 52 via a curved portion 60. The energy absorption segment 62 is shown as a generally flat portion that is received within the interior of the column tube 18 (see FIG. 1). The curved portion is located at or near an edge of the column tube or a notch within the column tube to allow the column tube contact segment 52 to be outside of the column tube 18 and the energy absorption segment 62 within the column tube 18. During an impact, the energy absorption segment 62 may deform, thereby acting to absorb energy and/or slow the collapse of the steering column assembly. Upon forward translation of the column tube, such as during an impact exceeding a threshold load, the column tube 18 may contact the curved portion 60, pushing it in a forward direction and causing the energy absorption segment 62 to straighten and/or deform. A new curved portion 60 may form (e.g., in an area previously part of the energy absorption segment 62), as the deformation of the energy absorption segment 62 is guided by the column tube and/or a guide structure. Deformation may be guided by a guide structure located at or near the edge of the column tube (e.g., at a notch in the column tube), such that the curved portion 60 and/or the energy absorption segment 62 wraps around the guide structure. The energy absorption segment 62 may be pulled forward and may coil around the guide structure as the column tube 18 translates forward. Assemblies free of a guide structure are also contemplated.

The connection member 50 includes a shroud attachment portion 70. The shroud attachment portion 70 as shown extends from a side wall 54, though other configurations are also contemplated. The shroud attachment portion extends at an angle from the edge of the side wall 54 (e.g., forming an angle with the side wall of about 90 degrees ± about 10 degrees). The shroud attachment portion 70 provides a contact surface with the shroud 30 (e.g., at a shroud boss 32).

Figure 3:
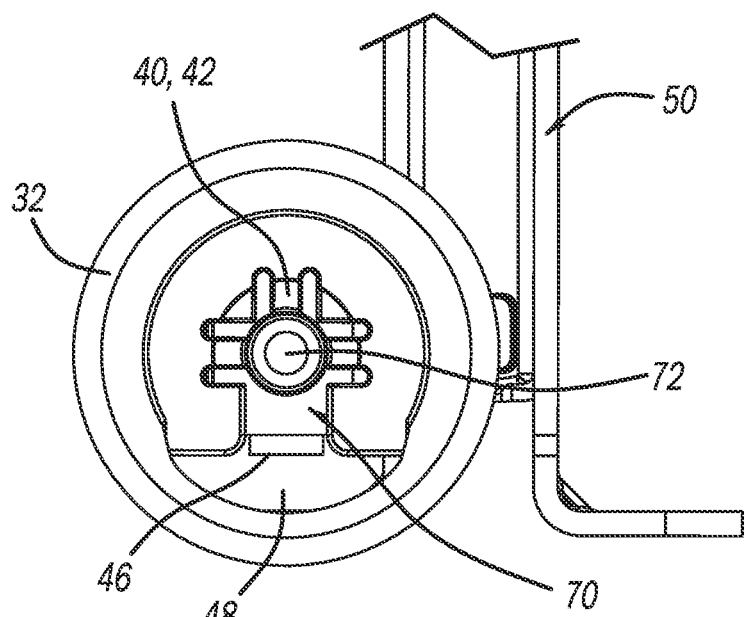
FIG. 3 is a bottom view of an exemplary shroud boss in accordance with the present teachings.

FIG. 3 shows a shroud boss 32 in contact with an attachment portion 70 of a connection member 50. The attachment portion 70 includes a fastener opening 72 through which a fastener 36 (see FIGS. 4 and 5) can be received, joining the shroud 30 to the connection member 50.

Figure 4:
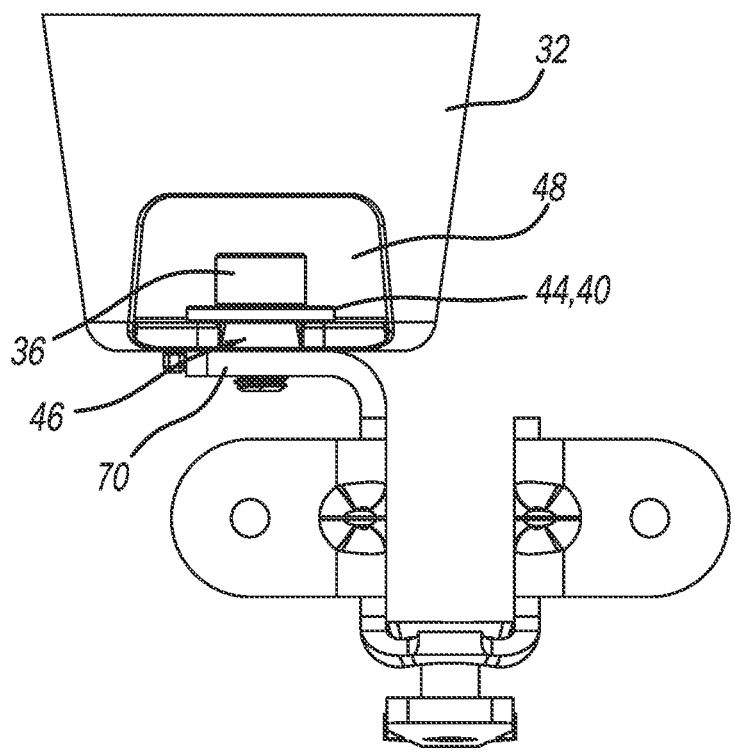
FIG. 4 is a side view of an exemplary shroud boss and shroud attachment portion of a connection member in accordance with the present teachings.
Figure 5:
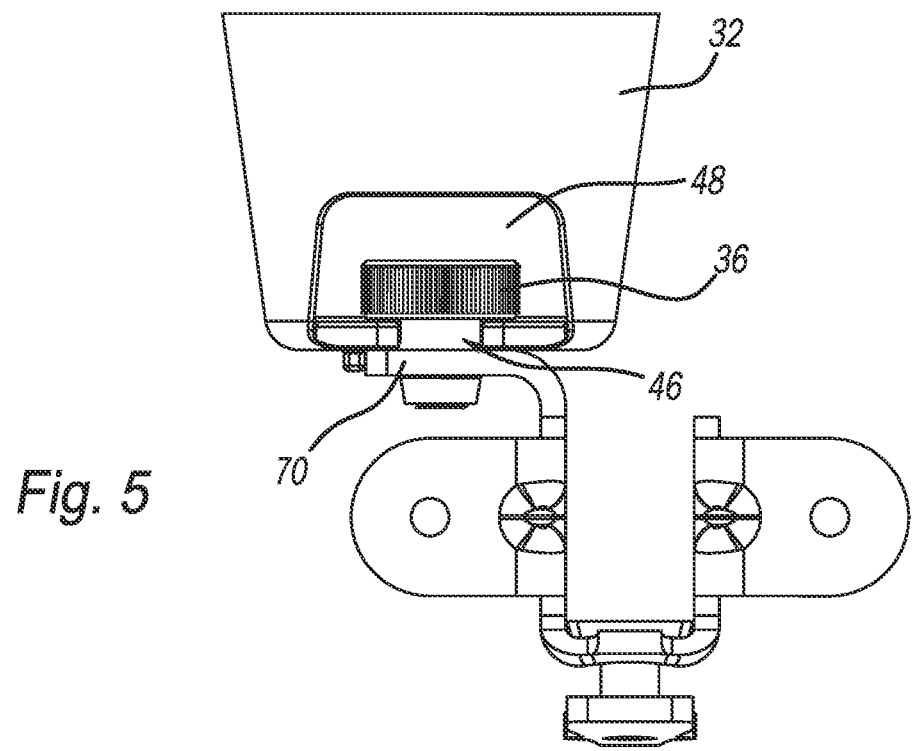
FIG. 5 is a side view of an exemplary shroud boss and shroud attachment portion of a connection member in accordance with the present teachings.

As shown in FIGS. 3, 4, and 5, the shroud boss 32 includes a slot 46 within which a portion of a fastener 36 (see FIGS. 4 and 5) can be received. In the area of the slot 46 may be one or more biasing members 40. The biasing members shown in FIG. 3 are a plurality of spring fingers 42 formed in the shroud itself. FIG. 4 shows a separate spring, such as a Belleville spring or O-ring 44. The biasing member may be a crush rib model in the shroud. The shroud may be pre-loaded into the shroud attachment portion 70 by the biasing member 40, such as the spring fingers 42, Belleville spring or O-ring 44, or a crush rib arrangement. The biasing member 40 may work with a controlled standoff to set the pre-load in a desired range. The controlled standoff may, for example, be a shoulder of a fastener or a ring located between the head of the fastener and the fingers.

The shroud boss 32 includes an opening 48, which allows the fastener 36 to be slid in or out of engagement with the shroud boss upon certain conditions. For example, during an impact exceeding a threshold load, the shroud 30 or shroud boss 32 may break away from the connection member 50 at the shroud attachment portion 70. The fastener 36 may remain fixed to the shroud attachment portion 70. The shroud attachment portion 70 and/or the connection member 50 may remain fixed within the steering column assembly, vehicle assembly, or both. The shroud 30 or shroud boss 32 may separate from the fastener 36, connection member 50, shroud attachment portion 70, or a combination thereof, with the fastener 36 being permitted to travel through the slot 46 and out through the opening 48.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

As can be appreciated, variations in the above teachings may be employed. For example, it may be possible to make the steering wheel adjustment subassembly from multiple subassemblies. The energy absorption mechanism described may be substituted with some other mechanism. Though the teachings herein may reference to a secondary impact events as occasioning certain of the functional aspects of the teachings, the teachings are not solely limited to secondary impact events. Rather, where reference is made to secondary impact, unless otherwise qualified, the teachings should be regarded as contemplating other impacts or conditions in which a threshold load (e.g., in a forward facing direction in a vehicle) is encountered that substantially exceeds a normal operational load and where translation of the column tube may be desirable for substantially reducing load that otherwise would be transferred to a vehicle operator.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consisting of, the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

Relative positional relationships of elements depicted in the drawings are part of the teachings herein, even if not verbally described. Geometries shown in the drawings (though not intended to be limiting) are also within the scope of the teachings, even if not verbally described.

What is claimed is:

1. An article comprising:
   a portion of a shroud adapted to be secured to a steering column assembly, wherein the portion of the shroud is a boss protecting toward a portion of the steering column assembly;
   wherein the portion of the shroud includes:
   a) a slot for receiving a portion of a fastener; and
   b) an opening;
      wherein the opening is larger than a head of the fastener so that the head of the fastener is adapted to travel through the opening to allow the shroud to break away from the steering column assembly upon an impact exceeding a threshold load.

2. The article of claim 1, wherein the slot is connected to or begins at the opening, such that a portion of the fastener may be permitted to slide in and/or out of the slot through the opening.

3. The article of claim 1, wherein the article comprises the fastener, wherein the fastener has a head and an elongated body, and wherein the head has a width or diameter that is greater than a diameter of a cross-section of the elongated body.

4. The article of claim 3, wherein the width or diameter of the head of the fastener is greater than a width of the slot.

5. The article of claim 1, wherein the article comprises a connection member to which the shroud is fastened via the fastener to connect the shroud to the steering column assembly.

6. The article of claim 5, wherein the connection member includes a shroud attachment portion that contacts a portion of the shroud, and wherein the shroud attachment portion includes a fastener opening for receiving the fastener.

7. The article of claim 6, wherein the article comprises a biasing member and a breakaway load of the attachment between the shroud and the steering column assembly is controlled by a controlled pre-load of the shroud into the fastener and shroud attachment portion.

8. The article of claim 7, wherein the biasing member is one or more spring fingers formed in the boss and extending into the slot, a spring member, a compressible member, one or more crush ribs in the shroud, or a combination thereof.

9. The article of claim 7, wherein the controlled pre-load is about 100 N or greater, about 500 N or less, or both.

10. The article of claim 7, wherein the controlled pre-load is controlled with a standoff, wherein the standoff is a shoulder on the fastener, a boss extending from the connection member, or the boss projecting toward the portion of the steering column assembly.

11. The article of claim 5, wherein the connection member is adapted to be secured to a column tube of the steering column assembly at a column tube contact segment.

12. The article of claim 11, wherein the connection member includes generally opposing side walls extending away from the column tube contact segment.

13. The article of claim 12, wherein the generally opposing side walls include a slot for receiving an elongated member.

14. The article of claim 11, wherein the connection member includes an energy absorption segment connected to the column tube contact segment via a curved portion.

15. The article of claim 5, wherein the connection member is fixed within a vehicle assembly.

16. The article of any of claim 5, wherein the connection member is adapted to break away from a portion of the steering column assembly during the impact exceeding the threshold load.

17. A collapsing steering column assembly comprising:
a. a column tube;
b. a steering shaft that is supported for rotation at least in part by the column tube;
c. a column housing;
d. a bracket for at least partially carrying the column tube;
e. the article of claim 1;
f. a manually operated steering wheel adjustment subassembly including a lever for manually adjusting the position of a steering wheel;
   wherein the article is adapted to break away from the column tube upon an impact exceeding a threshold load.

18. The collapsing steering column assembly of claim 17, wherein the portion of the shroud separates from the fastener and/or a connection member joining the shroud to the steering column assembly during the impact exceeding the threshold load.

19. An article comprising:
a) a connection member including:
   i) a column tube contact segment;
   ii) generally opposing side walls extending away from the column tube contact segment; and
   iii) a slot in the generally opposing side walls for receiving an elongated member; wherein the connection member is adapted to be secured to a column tube of a steering column assembly at the column tube contact segment;
b) a fastener;
c) a shroud joined to the connection member by the fastener, the shroud including:
   i) a slot for receiving a portion of the fastener; and
   ii) an opening, wherein the opening is of sufficient size that at least a portion of the fastener is permitted to fit through to allow the shroud to break away from the steering column assembly upon an impact exceeding a threshold load.

20. The article of claim 19, wherein shroud includes a boss projecting toward a portion of the steering column assembly.

* * * * *